Sept. 24, 1968  SEIJI NISHIGORI  3,402,608
DAMPING DEVICE OF A POINTER FOR A PRESSURE GAUGE
Filed Sept. 17, 1965
Fig. 1.
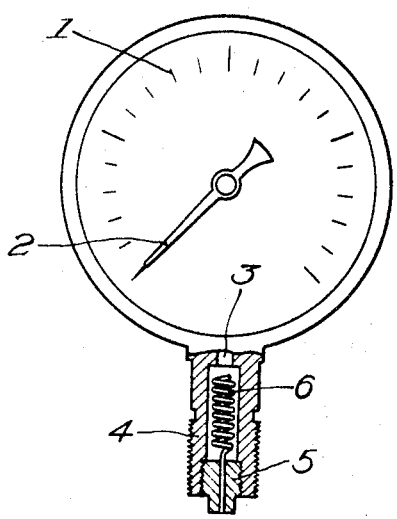
Fig. 2.
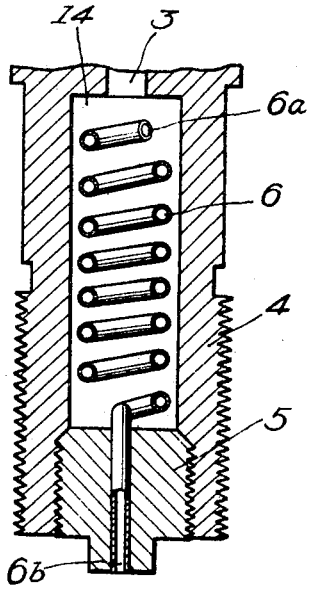
Fig. 3. Fig. 4. Fig. 5.
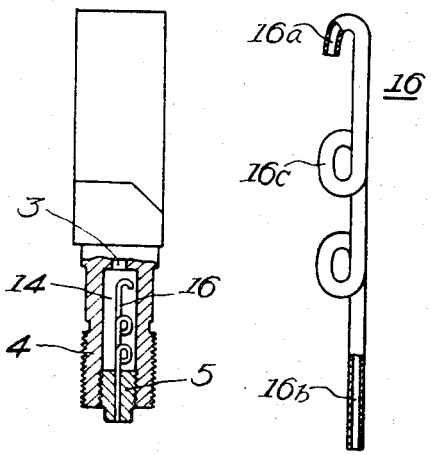 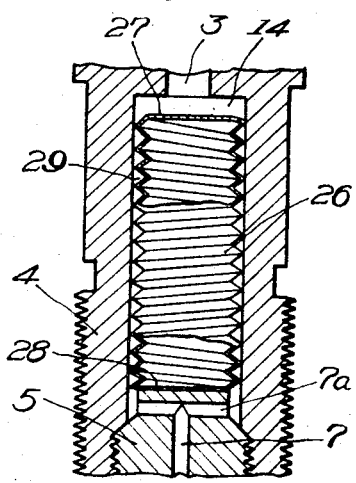
INVENTOR
Seiji Nishigori
BY
Oldham & Oldham
Attorneys United States Patent Office 3,402,608
Patented Sept. 24, 1968

3,402,608
DAMPING DEVICE OF A POINTER FOR A PRESSURE GAUGE
Seiji Nishigori, 2570 5-chome, Kamimeguro, Meguro-ku, Tokyo, Japan
Filed Sept. 17, 1965, Ser. No. 488,119
Claims priority, application Japan, Sept. 18, 1964, 39/53,044
1 Claim. (Cl. 73—392)

ABSTRACT OF THE DISCLOSURE

This damping device for a pressure gauge includes a coiled elastic capillary tube connected in the gauge for flow of the pressure fluid therethrough. The coiled tube elongates by its resistance to the flow of pressure fluid therethrough which is discharged from the free open end of the capillary tube to flow to the pressure gauge.

The present invention relates to a damping device of a pointer for a pressure gauge.

It is one object of the present invention to provide a damping device which comprises an elastic coiled capillary being installed in a pressure distributing pipe and a foundation piece being screwed in a share of the pressure gauge. When a pressure to be measured is transmitted to a pressure sensor, for example, Bourdon tube, bellows etc., passing through the elastic coiled capillary, a pulsating component of the pressure is damped.

It is another object of the present invention to provide a damping device of a pointer for an indicating type pressure gauge in a relatively easy and effective manner and in a cheap cost and in a small space loan when the pressure being measured is held at a very high rate or a instantaneously pulsating state.

It is yet another object of the present invention to provide a damping device which is not always installed in the indicating type pressure gauge, but also in other type ones, without use of special attachments or accessories.

With those and other objects in view, which will become apparent in the following detailed description, the present invention will be clearly understood in connection with the accompanying drawing, in which:

FIG. 1 is a partial sectional view of an embodiment of the present invention.

FIG. 2 is an enlarged sectional view of the damping device, shown in FIG. 1.

FIG. 3 is a partial sectional view of another embodiment of the present invention.

FIG. 4 is an enlarged side view of the elastic coiled capillary shown in FIG. 3, partially broken away.

FIG. 5 is a vertical sectional view of another additional embodiment of the present invention.

Referring now to the drawing, and in particular to FIGS. 1 and 2, the pressure being measured is transmitted to the pressure sensor, passing through the elastic coiled capillary 6, the inner radius of which is very small, being made of Phosphorus bronze, stainless steel or other elastic materials. A foundation piece 5 equipped with a male screw on the outside wall is screwed in a female screw on the lower inside wall of the share 4 of the pressure gauge. An upper part of the elastic coiled capillary 6 is formed as a free end 6a equipped with an opening and a lower part of that 6b is straightened. The straight part 6b of the capillary is inserted and fixed in the hole of the foundation piece 5. The elastic coiled capillary 6 is positioned in an inside chamber 14 of the share 4. A port 3 is a narrow passage which is equipped on the upper wall of the share 4. A pressure medium is fed into the pressure sensor, passing through the distributing pipe, the lower straight capillary 6b, the elastic coiled capillary 6 and the port 3, from a pressure source, the pressure of which is to be measured.

There are many cases when a pressure, the component of which is an instantaneously pulsating one, is transmitted to the pressure gauge. In the present invention, the pulsating component $\Delta p$ is absorbed. A static component $P_o$ is transmitted to the pressure sensor.

The pressure being transmitted in the lower straight capillary 6b is one part of the pulsating component $\Delta p$ plus the static pressure $P_o$.

The other part of the pulsating component being reflected on the bottom of the foundation piece 5 doesn't be transmitted to the pressure sensor.

Further, when the one part of the pulsating component is transmitted to the elastic coiled capillary 6, the inner diameter of the capillary is elastically enlarged. There have been occured frictional resistance and longitudinal elongation of the elastic coiled capillary 6, which are induced by transmission of the pulsating pressure $P_o \pm \Delta p$ to the elastic coiled capillary 6. The pulsating component is transmitted to the pressure sensor via the elastic coiled capillary 6 with the propagating velocity, reflecting one after another on the inner wall of the elastic coiled capillary 6. A propagating velocity of the pulsating component W can be determined by means of the formula set forth below, wherein an acceleration of gravity is $g$, modulus of cubical compressibility of the pressure medium is K, the unit weight of that is $\gamma$, the Youngs modulus of the distributing pipe is E, the diameter of that is D and the thickness of that is S.

$$W = \frac{\sqrt{g\frac{K}{\gamma}}}{\sqrt{1+\frac{K}{E}\frac{D}{s}}}$$

The values of the propagating velocity W vary with kinds of pressure mediums, temperatures of those, materials of the distributing pipes, dimensions of those etc. According to kinds of pressure mediums, for instance, in room temperature generally, $W=320$–$340$ m./s. for air, $W \doteqdot 1400$ m./s. for water and $W=1350$–$1450$ m./s. for train oil, castor oil and rapeseed oil. Consequently, the pulsating component is almost eliminated.

Nextly, when the pulsating component is transmitted to the inside chamber 14 of which the sectional area is comparatively longer than that of the elastic coiled capillary, the pulsating component is eliminated with proportion to the ratio of those sectional areas.

In this invention, furthermore, the pressure being transmitted to the pressure sensor doesn't practically include the pulsating component, by the damping effect of the damping device.

An oscillating motion of the pointer of the pressure gauge can be avoided in a relatively easy and effective manner and in a highly exact manner even when the pressure to be measured is held at a very high rate and at an instantaneously pulsating state. An inner diameter, a wall thickness and a length of the elastic coiled capillary are properly selected, according to pressure ranges, kinds of the pressure mediums etc.

FIGS. 3, 4 and 5 disclose two embodiments of the damping devices. FIG. 4 shows an elastic coiled capillary, the upper part of which is formed as a free end 16a equipped with an opening and the lower part of that 16b is straighten. In the embodiment shown in FIG. 5, instead of using the elastic coiled capillary, as disclosed in FIGS. 1, 2 and 3, a bellows 26 being installed on the foundation piece 5 is used. The bellows 26 having an upper plate 27 and a lower plate 28, is made of elastic material. A passage 7 is vertically made in the central part of the foundation piece 5. A port 7a is horizontally made in the upper part of the foundation piece 5 and is connected with the passage 7. Consequently, the damping action are effected successively in the same manner, as in the previous device, in connection with the embodiment disclosed in FIGS. 1 and 2.

When the elastic coiled capillary being made of 18–8 nickel-chrome steel, the inner diameter of which is 0.1 mm., the thickness of that is 0.05 mm. and numbers of coils of that is 10, was installed in the pressure gauge of which the maximum rating pressure is 10 kg./cm.² and the minimum graduation of that is 0.2 kg./cm.², to damp the pulsating pressure, the amount of which $Po \pm \Delta p$ is $10 \pm 2.5$ kg./cm.² and a period of that is 1.6 seconds, an amplitude of oscillation of the pointer was less than one-twenty of the minimum graduation.

As may be ascertained for above example, satisfied results are obtained successively.

A damage of the pressure gauge resulting from the oscillating motion of the pointer, can be effectively avoided.

In this invention, the damping device is made as small as possible as within the permissible conditions. The above facts have been established theoretically and practically and assure that the damping device of the pointer for the pressure gauge, permits wide industrial application.

While I have disclosed several embodiments of the present invention, it is to be understood that these embodiments are given by example only and not in a limiting sense, the scope of the present invention being determined by the objects and the claim.

What I claim is:
1. In a fluid pressure gauge a damping device comprising the combination of
   means operatively carried by the gauge to receive and transmit fluid under pressure to the gauge,
   capillary tube means carried in fluid-tight relationship within said first-named means through which the fluid under pressure must act to actuate the gauge, said tube means being resilient and elastic to damp out fluctuations in the fluid pressure passed to said first-named means, and
   said tube means includes a coiled tube of capillary size, said tube having an inverted J-shaped end which is open for pressure fluid flow therethrough, the coils in said tube being axially spaced from each other.

References Cited
UNITED STATES PATENTS

| | | | |
|---|---|---|---|
| 1,087,883 | 2/1914 | Loomis | 73—392 |
| 1,622,843 | 3/1927 | Price et al. | 73—392 |
| 1,941,613 | 1/1934 | McDonell | 73—392 XR |
| 2,140,954 | 12/1938 | Frazee. | |
| 2,660,890 | 12/1953 | Fletcher | 73—392 |
| 2,804,093 | 8/1957 | Scherer | 73—392 XR |
| 3,241,365 | 3/1966 | Schroener et al. | 73—392 XR |

S. CLEMENT SWISHER, *Acting Primary Examiner.*

DONALD O. WOODIEL, *Assistant Examiner.*